G. W. HOOVER ET AL
COMBINED ATTITUDE AND DIRECTIONAL
INSTRUMENT FOR AIRCRAFT 2,487,809

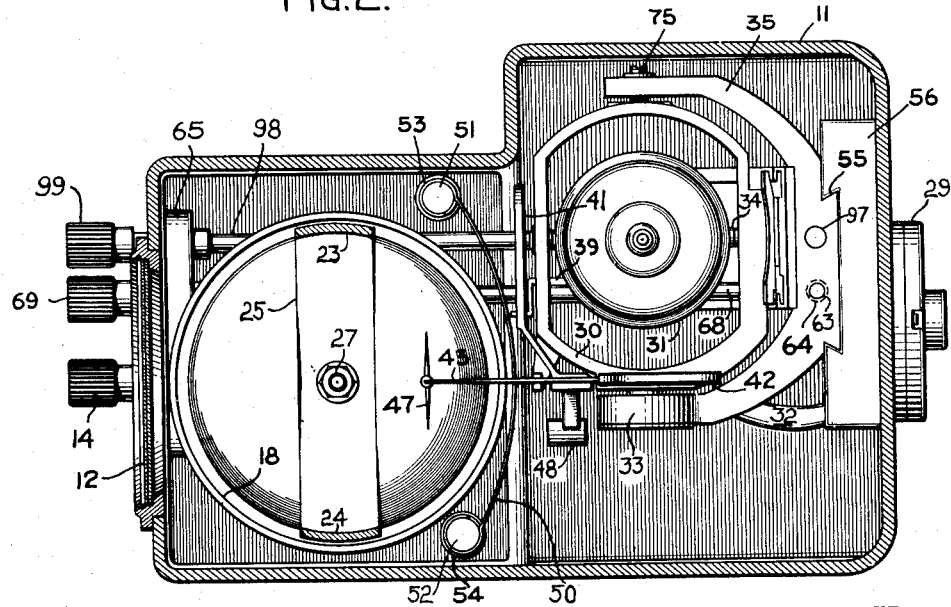
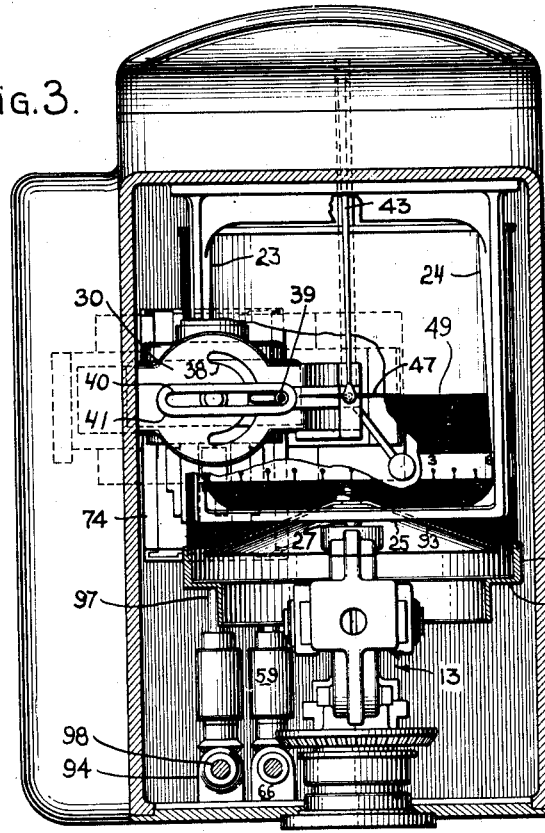
Fig. 2.
Fig. 3.
Fig. 4.
Fig. 5.
Inventors
GEORGE W. HOOVER
ERVING E. EASTON Nov. 15, 1949

Filed Sept. 28, 1944

Inventors
GEORGE W. HOOVER
ERVING E. EASTON
By W. Glenn Jones
Attorney

GEORGE W. HOOVER
ERVING E. EASTON

Nov. 15, 1949
G. W. HOOVER ET AL
2,487,809
COMBINED ATTITUDE AND DIRECTIONAL
INSTRUMENT FOR AIRCRAFT
Filed Sept. 28, 1944
6 Sheets-Sheet 5
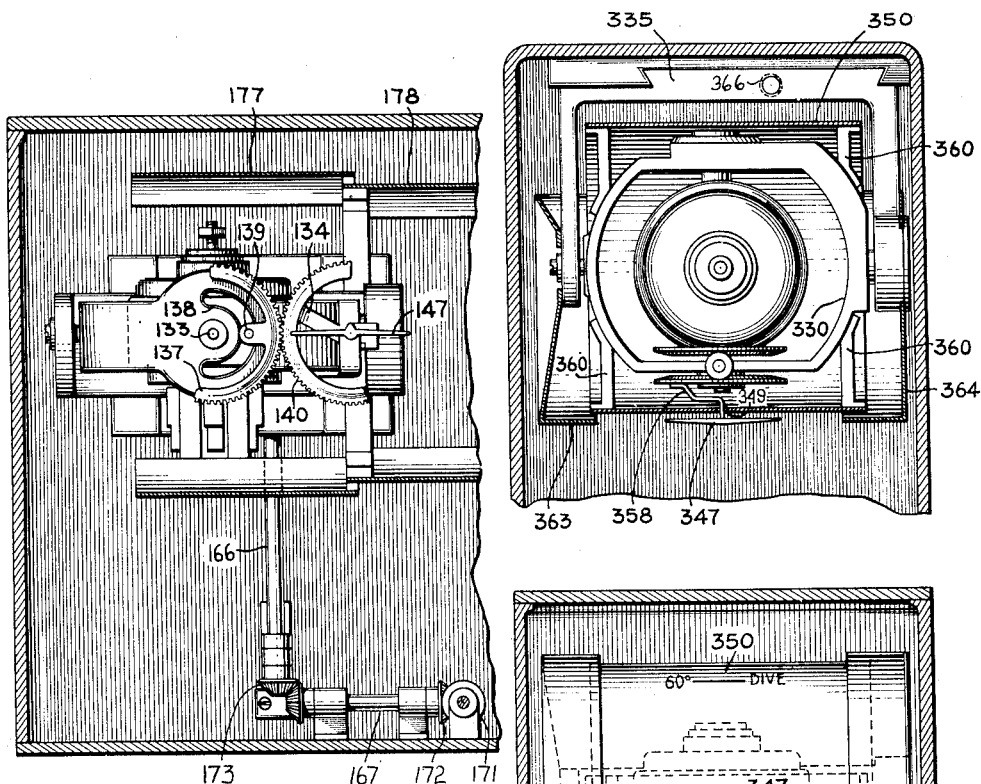
Fig. 13.
Fig. 10.
Fig. 14.
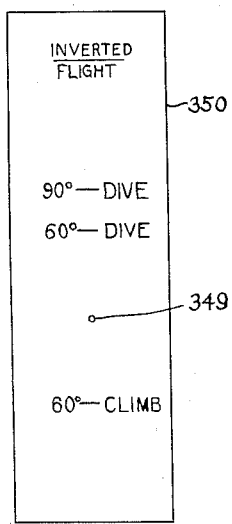
Fig. 16
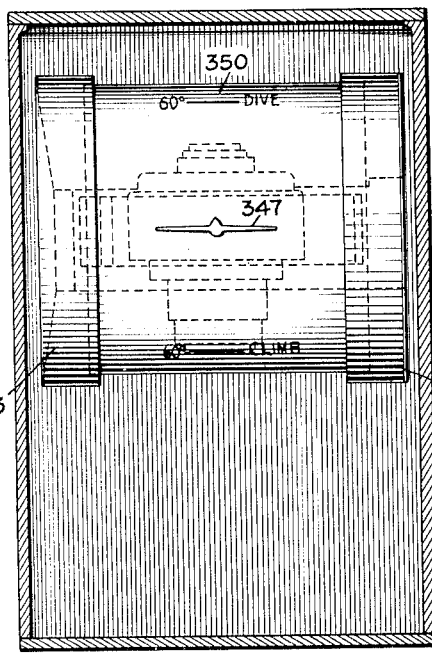
Inventors
GEORGE W. HOOVER
ERVING E. EASTON
By W Glenn Jones
Attorney Nov. 15, 1949  G. W. HOOVER ET AL  2,487,809
COMBINED ATTITUDE AND DIRECTIONAL
INSTRUMENT FOR AIRCRAFT
Filed Sept. 28, 1944  6 Sheets-Sheet 6

Inventors
GEORGE W. HOOVER
ERVING E. EASTON
By W. Glenn Jones
Attorney

Patented Nov. 15, 1949

2,487,809

UNITED STATES PATENT OFFICE 2,487,809

COMBINED ATTITUDE AND DIRECTIONAL INSTRUMENT FOR AIRCRAFT

George W. Hoover and Erving E. Easton, United States Navy

Application September 28, 1944, Serial No. 556,244

14 Claims. (Cl. 33—204)

(Granted under the act of March 3, 1883, as amended April 30, 1928; 370 O. G. 757)

This invention relates to aircraft flight instruments, particularly to the type giving in one instrument the attitude of the aircraft with relation to the horizontal plane, as well as its heading.

Combined instruments which give the inclination of the aircraft about its lateral and longitudinal axes, as well as the direction in which the aircraft is heading, have been previously made, and have accomplished the desired results by various mechanisms. We have devised an instrument accomplishing the desired purpose in a new and improved manner whereby the complete instrument is simplified in construction and its indications are easily read and understood. By reason of our construction the indications usually taken from the type of instrument known as an artificial horizon are combined with those from a directional instrument such as a magnetic or gyroscopic compass or the like to give in a single instrument the attitude of the air craft and its heading. In order to simplify the language used in the description, the term "attitude gyro" will be used to designate that part of the instrument having a gyroscope spinning about a substantially vertical axis, and from which the attitude of the aircraft with relation to a horizontal plane is determined. The term "directional gyro" will be used to designate that part of the instrument having a gyroscope spinning about a horizontal axis, and from which the heading of the aircraft is determined. While this part of the instrument is called a directional gyro to simplify the language, and while a conventional instrument of that type is illustrated, it is to be understood that the part of the complete instrument which is actuated by the illustrated directional gyroscope may be actuated by any other suitable directional instrument such as a magnetic or earth inductor compass through repeaters or the like. The combination of the "attitude gyro" together with the "directional gyro" and an arrangement of polarized elements results in an instrument which when viewed represents a scene of an airplane in flight. The pilot is therefore enabled to fly his aircraft by flying the viewed airplane with respect to the rest of the scene that he observes when looking at the instrument.

It is therefore the primary object of our invention to provide an improved flight instrument which indicates the attitude and heading of an aircraft during flight.

Another important object of the invention is to provide an improved flight instrument which has an indication representing a fanciful scene observed from the front of an aircraft in flight and wherein control of the aircraft may be accomplished by flying a silhouette of an airplane with respect to the scene represented.

Another object of the invention is the provision of an improved aircraft flight instrument wherein a fanciful scene is presented to the pilot to represent a scene as normally visible from the pilot's seat, and wherein an image or silhouette of an airplane moves with respect to the fanciful scene to represent the attitude and heading of the aircraft.

Another object of the invention is the provision of a directional instrument wherein a vertical cylindrical compass card is provided with graduations on its inner wall which are viewed directly in the same manner as if the card surrounded the observer.

Another object of the invention is the provision of a flight instrument wherein a picture representing a normal scene visible from the pilot's seat is formed of polarized particles on a transparent cylinder which is stabilized by a directional instrument and the picture is rendered visible by a window polarized with its axis of polarization parallel with the particles on one side of the cylinder and at right angles with the particles on the cylindrical wall remote from the window.

It is another object of the invention to provide an aircraft flight instrument combining attitude and directional readings wherein the means defining the horizon tilts with the aircraft and the means showing the attitude moves with respect to both the aircraft and the natural horizon.

Another object of the instrument is to provide an aircraft flight instrument which indicates the attitude and heading of the aircraft during flight, and wherein the attitude indicating elements are freely movable through 360 degrees in any direction.

Another object of the invention is the incorporation of polarized elements to provide a novel improved optical system for an indicating instrument.

Further objects will become apparent as the description proceeds in connection with the appended claims and the annexed drawings wherein:

Fig. 2 is a plan view of the embodiment of Fig. 1, but with the top removed, and some parts in section to show the interior arrangement;

Fig. 3 is a front elevation of the embodiment of

Figure 1:
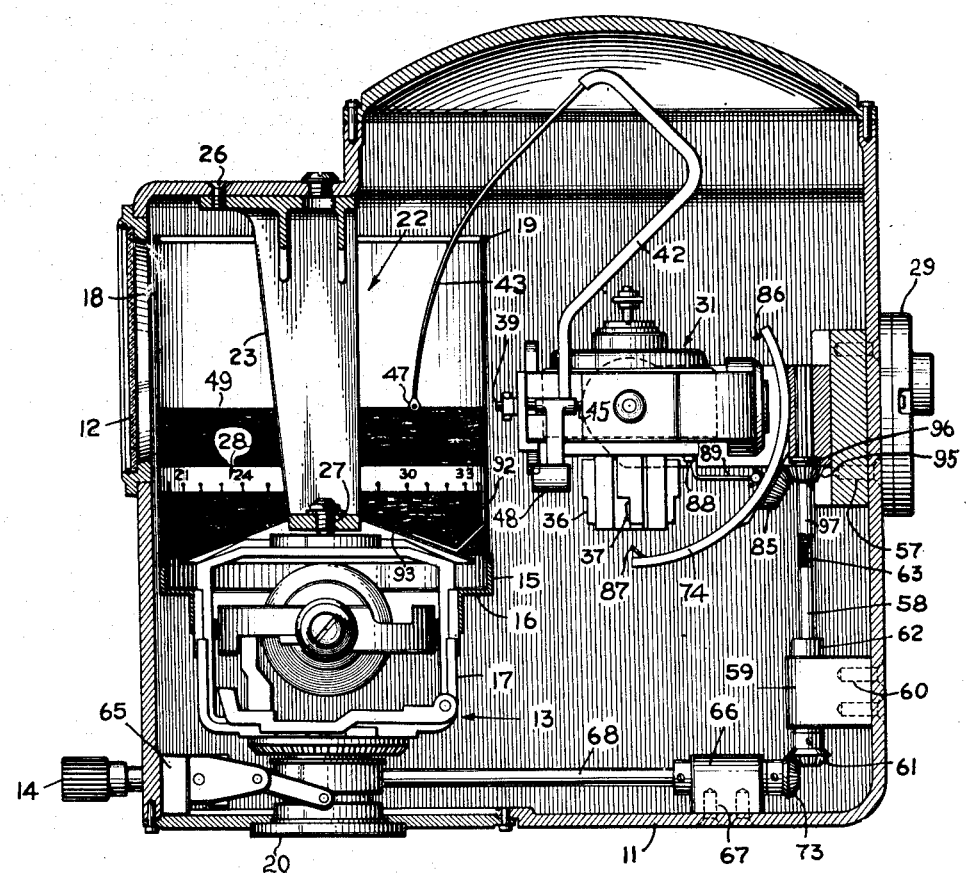
Fig. 1 is a side elevation view, partly in section, of the interior of one embodiment of the instrument.
Figure 6:
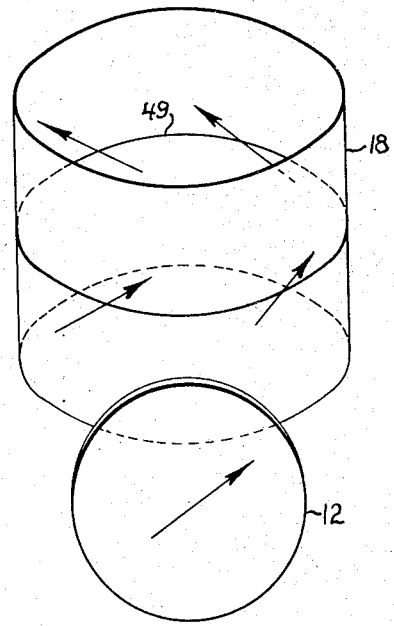
Figure 7:
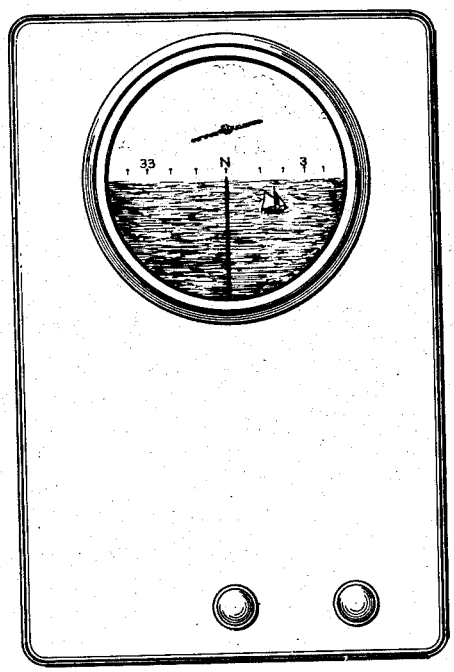
Figure 15:
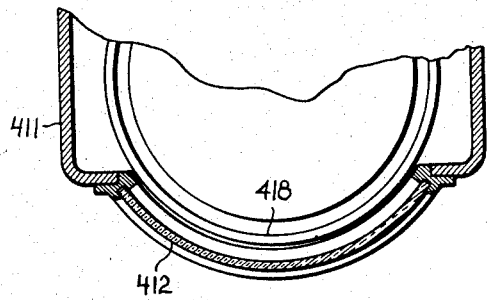
Figure 8:
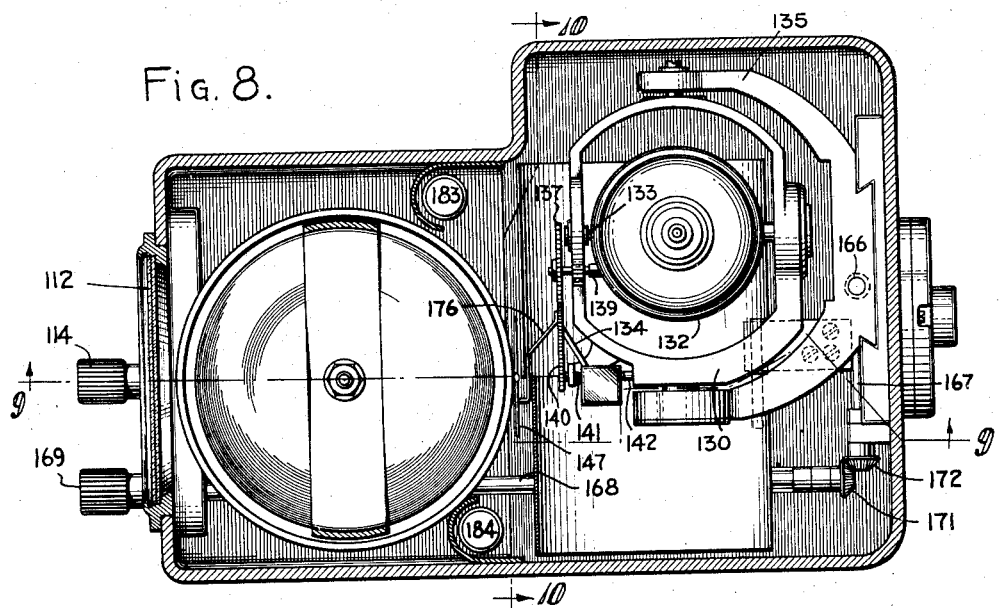
Figure 9:
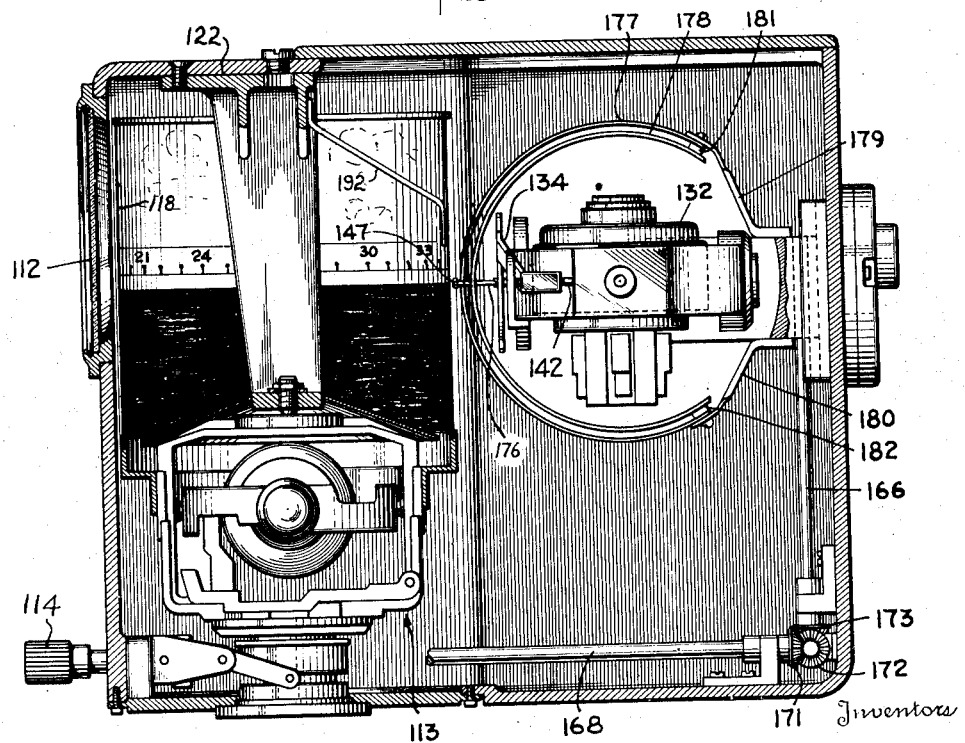
Figure 11:
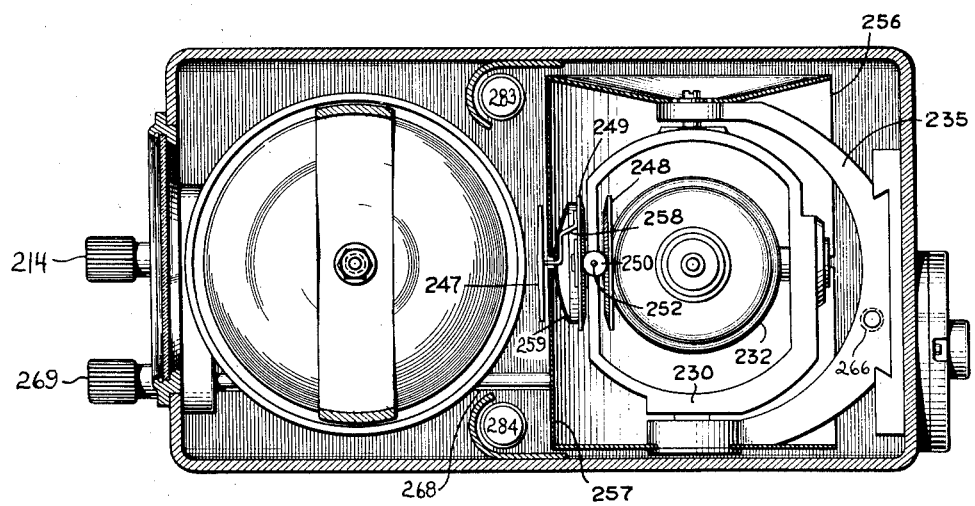
Figure 12:
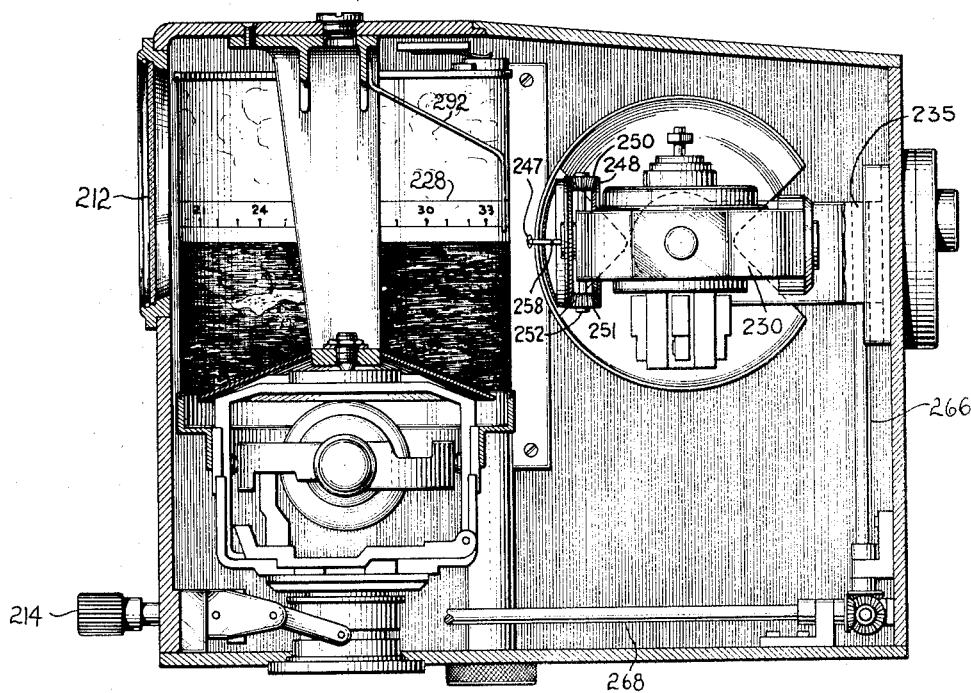

Fig. 1, but with the front of the case and other parts cut away to show the internal construction of the instrument;

Fig. 4 is a perspective view of part of the caging mechanism of the embodiment of Fig. 1;

Fig. 5 is a perspective view of another part of the caging mechanism of the embodiment of Fig. 1;

Fig. 6 is a perspective view illustrating the arrangement of the polarized elements of the instrument;

Fig. 7 is a front view showing the general appearance of the fanciful scene, the airplane silhouette, and the compass card as they appear to the observer;

Fig. 8 is a plan view of a second embodiment with the top removed and some parts in section to show the interior arrangement;

Fig. 9 is a side elevation view, partly in section, along the line 9—9 of Fig. 8;

Fig. 10 is a front elevation, partly in section, along the line 10—10 of Fig. 8, and with other elements forming the screen cut away to expose the parts particularly illustrated in Fig. 10;

Fig. 11 is a plan view of a third embodiment, with the top removed and some parts in section to show the interior arrangement;

Fig. 12 is a side elevation, partly in section of the interior of the same embodiment as Fig. 11;

Fig. 13 is a plan view partly in section of another embodiment of the attitude gyro part of the instrument;

Fig. 14 is a front elevation of the attitude gyro embodiment shown in Fig. 13;

Fig. 15 is a horizontal sectional view through the front part of a modified housing and window construction which makes the indications of the instrument visible from a wider angle; and Fig. 16 represents a plane development of the cylindrical screen of Figs. 13 and 14.

As shown in Figs. 1 and 2 the instrument comprises an airtight housing 11 having an L shape in horizontal cross-section. At its front there is a vertical circular window 12 for viewing the indicator inside the casing. The window includes a sheet of "Polaroid" or other polarized material, of the same size as the cover glass, and having its axis of polarization inclined 45 degrees to the horizontal for a purpose to be described. The front part of the housing is occupied by the direction indicating element of the instrument which is for convenience referred to as the "directional gyro." The rear part of the housing is occupied by the "attitude horizon" element of the combined instrument. Within the front lower part of the casing is a directional gyroscope 13 of conventional design, having its vertical axis intersecting the axis of the circular window as is apparent from Fig. 2. Air for driving the gyroscope enters through the inlet 20 and is withdrawn from the housing through a suitable vacuum connection, not shown. A caging knob 14 protrudes from the front of the casing and when pushed in to cage the gyroscope it may also be turned to properly orient the directional gyroscope compass card in the conventional manner.

The compass card of the directional gyroscope is replaced by an enlarged ring having a vertical portion 15 and a horizontal portion 16 which is fastened to the outer side of the vertical gimbal ring 17.

A cylinder 18 of a transparent plastic material, has its bottom edge fastened in any suitable manner to the vertical portion 15 of the ring. The cylinder extends upwardly to approximately the top of the window 12, as shown in Fig. 1, there being a stiffening ring 19 fastened to the top thereof.

A frame 22, substantially square in front elevation and having a substantially square opening which defines side legs 23 and 24 and a bottom leg 25, is fastened by its top leg to the inside top of the housing with screws 26. The bottom leg 25 serves as the support for the upper pivot 27 of the vertical gimbal ring 17 of the directional gyroscope 13. The side legs 23 and 24 lie within and closely adjacent the inner side walls of the cylinder 18 as appears particularly in Figs. 2 and 3, so that they do not interfere with the view seen by the observer looking through the window 12.

On its interior surface, and slightly below the level of the bottom of the window 12 the cylinder has a graduated scale 28 corresponding to the scale on the exterior of the conventional directional gyroscope card, except that the graduations are arranged 180 degrees out of phase from the normal arrangement on the outside of the card on that type of instrument. This arrangement is necessary because in accordance with our invention the observer will read the scale on the inside of the cylinder 18 and on that part of the cylinder most remote from the window 12.

It is thus seen that the part of the instrument so far described is a modified directional gyroscope in which the graduations are read on the inside of a circular card and at that part remote from the window 12. This arrangement is advantageous because the compass card is thereby made direct reading instead of reversed reading as on the conventional compass card. Other features of the cylinder will be described subsequently in connection with the attitude indicia of the instrument.

As mentioned before, the rear part of the housing is occupied by the "attitude horizon" part of the instrument. About mid-point of its height and in the rear part thereof is an artificial horizon type gyroscope and housing 31 mounted in a gimbal ring 30 so as to pivot about a normally horizontal fore and aft axis. The inner ring 30 is in turn freely suspended about a normally horizontal transverse axis within a support 35 which is vertically adjustable in position within the housing. It should be noted that the described gyroscope 31 and gimbal system is thus the same as a conventional artificial horizon type gyroscope and gimbal system except that it is rotated 90 degrees (in a clockwise direction as viewed in Fig. 2) from the normal fore and aft position of a conventional artificial horizon gyroscope as mounted in an airplane. Any usual erecting system such as the vane indicated at 36 together with the air exhaust ports 37 is used and the air is supplied from the intake 29 through support 56 and a flexible hose 32 (Fig. 2) to a passage in the support 35 from which it enters the gyro housing through the air pivot and bearing 33, the gimbal ring 30 and the bearing 34 in the conventional manner.

As shown in Fig. 3 the forward part of the gimbal ring 30 is widened and has a circular slot 38 therethrough. A guide pin 39 which is carried by the gyro housing 31 extends through this slot in the same manner as in a conventional artificial horizon and after passing therethrough is bent away from the slot 38 and then forward again so as to project through a rectilinear slot 40 in a bar 41. The bar 41 is pivotally attached to the gimbal ring 30 adjacent the gimbal bearing 33 by means of the pivot 45 (Fig. 1). It will be remembered that the gyroscope and gimbal system is rotated 90 degrees from that of a conventional system. For that reason, a lateral tilt of the airplane in which the instrument is mounted will result in a rotation of the bar 41 about its pivot 45.

The axis of the pivot 45 is normally in the same vertical plane as the axis of the cylinder 18, but at right angles thereto and intersecting the cylinder about half way between its top and bottom edges. As shown in Fig. 1 the bar 41 has an extension 42 extending upwards in a vertical plane. The side view of extension 42 in Fig. 1 shows that it is bent backwards and then forward again, and adjacent its top terminates in a thinner extension 43 which passes over the top of the wall of the cylinder 18 and downwards, terminating when it intersects the axis of the bar pivot 45. At its terminus there is attached a silhouette 47 of an airplane, appearing as a rear view thereof.

The extensions 42 and 43 are of such length and configuration that the gimbal ring 30 of the gyroscope 31 can pivot about its transverse axis to raise or lower the airplane silhouette 47 without the silhouette touching the cylinder 18. The bar 41 and extensions 42 and 43 are counterbalanced about the pivot 45 by a counterweight 48.

As previously described, the cylinder 18 is a transparent material, and when viewed through window 12 the gyroscope 31 and gimbal system would be visible. However, a vertical screen 50 (shown in Fig. 2 but not in Figs. 1 or 3) is fixed between the cylinder 18 and the artificial horizon and gimbal system, the screen being slightly bowed in horizontal cross-section as shown. Adjacent the sides of the screen 50 are light bulbs 51 and 52 which illuminate it. The bulbs are shielded by elements 53 and 54 which may be extensions of the screen 50, so that the light from the bulbs is not directly visible from the window 12 but is directed primarily against the screen 50 and against the rearward portion of the cylinder 18. Thus the illuminated screen 50 and the silhouette 47 of the airplane are visible through the window 12.

The transparent cylinder has applied to it a polarized pictorial scene comprising a horizon 49, a landscape or seascape below the horizon, and a skyscape above the horizon. This scene may be for example applied to the cylinder while it is unrolled and flattened, by the method described in the Land Patent No. 2,315,373. The axis of polarization of the polarized image on the cylinder is at an angle of 45 degrees to the base of the cylinder when unrolled so that it is flat. Thus in that part of the cylinder 18 adjacent the window 12 the axis of polarization of the image is parallel to the axis of polarization of the "Polaroid" material in the window. However, as shown in Fig. 6, the part of the image diametrically opposite, or on the part of the cylinder remote from the window, will have an axis polarization which is 90 degrees from that of the window. Because of this arrangement, when an observer looks through the window 12 he will see the scene on the part of the cylinder 18 which is remote from the window since the image on that part of the cylinder is polarized at right angles to the window. The image on the front part of the cylinder, being polarized in the same axis as the window, is rendered relatively invisible and the forward part of the cylinder appears merely as a transparent curved wall when viewed through the polarized window 12. The observer looking through the window thus sees a scene which is similar to that seen in a forward view from an airplane, and superimposed upon that scene he sees the silhouette 47 of the airplane. In the scene portrayed on the cylinder 18, the horizon 49 is substantially at the mid-point of the height of the cylinder.

With the instrument mounted in the airplane the scene visible to the pilot through window 12, which is shown best in Fig. 7, is a substantial duplicate of a normal scene from the pilot's seat, including a skyscape and a landscape or seascape meeting at a horizon line. As the airplane turns to the right or left, the cylinder does not turn, but the pilot looking into it sees the scene change just as the actual scenery does. He also sees the graduated compass scale giving him his correct heading as the actual airplane and the silhouette rotate during the turn. In Fig. 7 the graduated compass scale is shown above the horizon as in Figs. 9 and 12 instead of below the window level as in Figs. 1 and 3.

The position of the silhouette 47 is vertically adjustable by means which will be described. When adjusted to its proper position, and with the airplane in normal level flight, the silhouette will be at the level of the horizon 49 on the cylinder. In operation, the pilot flies so as to keep the silhouette leveled and aligned with the horizon. When making a banked turn to the right, although the axis of cylinder 18 will incline to the right with the vertical axis of the airplane, the silhouette 47 will incline with respect to the horizon 49 on the cylinder to indicate a right bank. At the same time, since the airplane is changing heading during the turn, the scene on the cylinder moves to the left just as the natural scenery does during a right turn. The heading is always indicated by the graduated scale 28 which is read at the lubber line 92. In the embodiment of Figs. 1 to 3 the lubber line 92 is fastened to the top of the conical shield 93 which hides the mechanism of the directional gyroscope 13. If the airplane noses up or down the silhouette 47 moves upward or downward respectively with respect to the cylinder 18 and the horizon thereon. Thus the position of the silhouette 47 with respect to the horizon on the cylinder indicates the attitude of the airplane with respect to the true horizon. It is preferred that the instrument be mounted so that the horizon on the cylinder is substantially at the eye level of the pilot in order to avoid parallax errors due to the substantial horizontal distance between the silhouette and the horizon line on the cylinder in the embodiment of Figs. 1 to 3. However, by means of the adjustment now to be described, the silhouette 47 can be aligned with the horizon to eliminate parallax.

As shown in Fig. 2, the rear of the support 35 has a vertical sliding dovetailed connection 55 to a support 56 which is fastened to the back wall of the housing 11 as by screws 57. A vertical shaft 58 is journalled at its lower end in a bearing block 59 which is fastened to the rear wall of the housing 11 as by screws 60. At its lower end, and below the block 59, a bevel gear 61 is fastened to the shaft 58. A collar 62 is fastened to shaft 58 just above the block 59, vertical movement of the shaft being prevented by the collar 62 and the gear 61. The shaft 58 is provided at its upper end with a threaded portion 63 which extends through a vertical threaded hole 64 in the rear portion of the support 35. Rotation of the shaft 58 will therefore cause the support 35 to move vertically upwards or downwards with respect to its support 56 and the housing 11. Since all of the mechanism constituting the attitude gyro is carried by support 35 it will be understood that the entire mechanism including the silhouette 47 is raised or lowered by the rotation of shaft 58.

On the front wall of the housing and fastened thereto at the lower part thereof, is a bearing block 65. In alignment with blocks 59 and 65 is a third bearing block 66 fastened to the bottom of the housing as by screws 67. A horizontal shaft 68 is journalled in the blocks 65 and 66 and has its forward end protruding from the front of the housing. A knob 69 is fastened to the protruding end of the shaft 68. At its rear end, shaft 68 has fixed thereto a bevel gear 73 which engages the gear 61 on shaft 58. Thus the support 35 and the attitude gyro device carried thereby are raised or lowered by turning the knob 69. The friction in the assembly is sufficient to hold it in adjusted position.

The caging device for the attitude instrument is shown in side elevation in Fig. 1 and in perspective in Fig. 4. A frame 74 which in side elevation is a circular arc having as its center the transverse axis 75—33 about which the gimbal ring 30 is pivoted, is fixedly attached to the support 35 and is vertically adjustable therewith. As appears in Fig. 4 the frame has two spaced and parallel channels 76 anad 77 running from end to end. The channels accommodate a pair of arcuate racks 78 and 79 respectively, the racks being inserted from the ends of the channels. The racks are retained in the channels by the lips 80 and 81 on the frame which partly overlie the channels and make their top narrower than their bottom. The longitudinal edges of the racks which face each other are provided with gear teeth 82 and 83, which engage a pinion 84 rotatably mounted in the frame 74 and with its axis meeting the axis 75—33 at right angles. The shaft (not shown) on which pinion 84 is mounted protrudes through the frame 74 and has a bevel gear 85 fastened thereto on the other side of the frame as shown in Fig. 1.

The bevel gear 85 engages a bevel gear 95 which is keyed to but may slide along a vertical shaft 97 which is slidably journalled at its upper end in the support 35. The gear 95 has a radial flange 96 on its upper part, slightly spaced from the gear teeth to provide a groove and seated in a recess in the support 35. Means such as a set screw threaded in the support 35 engages the groove and causes the gear 95 to move up or down the shaft 97 together with the support 35 and the frame 74 so that the gears 85 and 95 are always in meshing engagement. A horizontal shaft 98 (Figs. 2 and 3) which is journalled in bearing blocks 65 anad 94, has a knob 99 on the outside of the housing by which it may be turned to rotate shaft 97 through gears similar to 73 and 61.

The arcuate racks 78 and 79 are of the same length which is a little over half the length of the arcuate frame 74. At its upper end the rack 79 has fixed thereto a finger 86 which extends transversely of the frame 74 for substantially its complete width. The rack 78 has a similar finger 87 fixed thereto at its lower end. When the pinion 84 is rotated the racks 78 and 79 are simultaneously moved in opposite directions. The racks are so disposed with respect to each other so that the fingers are always substantially equidistant from the axis of the pinion 84, and thus the fingers are simultaneously moved either towards or away from the gear 84 when it is rotated, depending on its direction of rotation.

A caging lug support arm 89, shown in perspective in Fig. 5 is attached to the bottom of the gyro housing 31 as by screws 88, and the caging lug 90 at the free end thereof is in the path of movement of the fingers 86 and 87. Normally, with the instrument operating, it is uncaged and the fingers are at the outer end of their strokes and remote from each other. However, as the knob 99 and pinion 84 are rotated to bring the fingers towards each other, they engage the lug 90. When the fingers have been moved together towards their innermost positions, as indicated by the dotted lines of Fig. 1, they engage the caging lug 90 between them and prevent the movement of the gyro housing within the gimbal rings so that the attitude gyro is locked.

In the embodiment shown in Figs. 8, 9 and 10 the long horizon bar extensions 42 and 43 which extend over the top of the cylinder and then down again are eliminated by placing the airplane silhouette 147 behind and on the outside of the cylinder 118, as shown in Figs. 8 and 9. The height of the housing 111 is substantially reduced by means of this arrangement, as are the embodiments of Figs. 11 to 14.

The directional gyro 113 is of the same construction as in the embodiment of Figs. 1 to 3, and its caging knob 114 protrudes from the front of the housing. As shown in Fig. 9, however, the graduated compass scale 128 is on a higher level on the cylinder, above the horizon line so that the pilot does not need to look down into the instrument to get his heading as when the scale is located as in Figs. 1 to 3. In order that only the graduations on the back of the cylinder be visible, they are applied in the same manner as the scene portrayed on the cylinder is applied, and as previously described in connection with the portrayal of the skyscape, etc., of Figs. 1 to 3. The lubber line 192 extends downward from the top of the frame 122.

The attitude instrument gyro and gimbal system is similar to that of Figs. 1 to 3, and is mounted in a support 135 which is vertically adjustable in the same manner as said first described embodiment. The adjusting knob 169 is attached to the front of a horizontal shaft 168 which drives a second horizontal shaft 167 and a vertical threaded shaft 166 through gears 171, 172, 173, etc. Rotation of the threaded shaft 166 raises or lowers the support 135 as will be understood.

The guide pin 139 which is carried by the gyro housing 132, projects through the guide pin slot 138 (Fig. 10) and carries fixed to its outer end a segmental spur gear 137 which has the same axis as the pivots 133 for the gyro housing. A second segmental spur gear 140 has meshing engagement with gear 137. The gear 140 is fastened to an arm 134 pivotally attached to the gimbal ring 130 about an axis perpendicular to the axis of the cylinder 118, by means of pivots 141 and 142 as shown in Figs. 8 and 9. The airplane silhouette 147 is attached to the gear by a bent arm 176 so that the silhouette 147 will tilt or rotate about the axis of pivots 141 and 142 as the gear 140 is rotated by gear 137 due to tilting of the gyro housing 132 with respect to the gimbal ring 130.

Although the silhouette 147 is behind the rear part of the cylinder 118, it is visible because the scene on the cylinder is quite transparent in the manner of a photographic negative. Instead of the fixed vertical screen 50 used in the first described embodiment of Figs. 1 to 3, a two piece screen is composed of cylindrically shaped and concentrically arranged elements 177 and 178. Element 177 is slightly larger in diameter than element 178, and is fastened to the support 135 by means of supports 179 and 180. As viewed in Fig. 10, the element 177 covers the left part of the attitude gyro and extends slightly to the right of the center of the silhouette 147. The element 178 is attached to element 177 by supports 181 and 182 which are in turn carried by the supports 179 and 180. As viewed in Fig. 10, the supported or right end of the element 177 slightly overlaps the left end of the smaller element 178, the element 178 extending to the right almost to the vertical end wall of the housing. There is thus provided a screen composed of elements 177 and 178 with a central gap running the length of their circumference, the gap not being visible when viewed from the front of the instrument because of the overlapping of the adjacent edges of the elements.

The central gap provides space for passage of the bent arm 176 which supports the silhouette 147 on the outside of the elements 177 and 178. Thus as the gyro housing 132 rotates within the gimbal ring 130 the silhouette tilts with respect to the elements 177 and 178 and with respect to the horizon line of the scene carried by the cylinder 118. As the gimbal ring 130 tilts within the support 135, due to tilting of the airplane about its lateral axis, the silhouette 147 is carried upwardly or downwardly and indicates a nose up or nose down position of the silhouette with respect to the horizon on the cylinder. It will be noted from Fig. 9 that the silhouette can move through a vertical angle of about 120 degrees in either direction from its normal position before its movement is interfered with by the supports 179 or 180.

Lights 183 and 184 illuminate the screen formed by elements 177 and 178, as well as the silhouette 147 and the back part of the cylinder 118. The window 112 includes a sheet of polaroid having its axis disposed in the same relation as the axis of the polarized scene on the cylinder 118, as does that in the embodiment of Figs. 1 to 3, and in fact such is the arrangement in all of the embodiments.

It should be noted that with the drive resulting from the gears 137 and 140, the tilt of the silhouette with respect to the horizon on the cylinder 118 will be directly proportional to the tilt of the gyro housing 132 within its gimbal ring 130, whereas in the embodiment of Figs. 1 to 3, the angular movement of the bar 41 with relation to the movement of the gyro housing decreases as the guide pin 39 moves away from its mid-position in the circular slot 38.

The embodiment of Figs. 11 and 12 is similar to that of Figs. 8 to 10 except in the type of screen behind the airplane silhouette 247 and in the means for tilting the silhouette. A bevel gear 248 is fixed to the gyro housing 232 and rotates with the housing about its pivots in the gimbal ring 230. A bevel gear 249 is carried by the gimbal ring 230 and is rotatable about the same axis as the gyro housing. A pair of bevel idler gears 250 and 251 are mounted on a shaft 252 on the gimbal ring 230 in such position that they engage both gears 248 and 249. By means of this construction, as the gyro housing tilts or rotates in one direction with respect to the gimbal ring 230 the gear 249 is rotated through an equal angle in the other direction.

The screen comprises two substantially cup shaped elements 256 and 257 attached by their bottoms to the ends of the support 235. Their top edges are slightly spaced as shown in Fig. 11 to provide an annular groove therebetween. An arm 258 fixed to the gear 249 passes through the annular groove and carries the silhouette 247 at its end. The end of the arm is coaxial with the axis of rotation of the gyro housing within the gimbal ring 230 instead of offset therefrom as in the previously described embodiments. By reason of this construction the entire attitude gyro is directly behind the directional gyro instead of being offset to one side as in the previously described embodiments. This permits a narrower housing as is apparent from Fig. 11. In this embodiment there are not any stops to prevent the gyro housing from rotating through 360 degrees within the gimbal ring 230, nor to prevent the gimbal ring 230 from rotating through 360 degrees within the support 235. In order to obscure or render less noticeable the slot between the elements 256 and 257, a dish shaped shield 259 having a central hole is carried by the gear 249 behind the slot and inside the cups 256 and 257. The shield 259 will rotate with and be carried around with the gear 249 and the silhouette 247, and being painted the same color as the outside of the cups 256 and 257 will be visible underneath the slot and make the slot less noticeable.

The embodiment of Figs. 13 and 14 differs from the embodiment of Figs. 11 and 12 in that the screen 350 is a continuous cylinder fixedly secured to the gimbal ring 330 by means of supports 360, and thereby rotatable together with the gimbal ring 330. A single opening 349 is provided in the front of the screen 350 for the passage of the arm 358 which has the silhouette 347 attached to its end. As shown in Fig. 13 the shape of the ring 335 is more rectangular than the ring 235 of Fig. 11, so as to make room for the continuous screen 350. In order to cover the ends of the screen 350 a pair of substantially cup shaped elements 363 and 364 are fastened to the ends of the support 335 so that their cylindrical sides slightly overlap the edges of the screen 350. As in the previous embodiment, the gyro housing is free to rotate through 360 degrees within the gimbal ring 330, which also has a full 360 degree freedom of movement.

All of the embodiments may have graduations on the transparent cylinder above and below the horizon to indicate angles of climb or dive, etc. Such graduations are more advantageously placed on the screens in those cases when the screen is comprised of cylindrical elements having a horizontal axis. However, in the embodiment of Figs. 13 and 14 the rotating cylindrical screen 350 is particularly adaptable for such use and retains its function as a diving or climbing angle indicator even when the silhouette has passed out of view. Fig. 16 shows the development on a plane surface of the cylindrical screen 350 of Figs. 13 and 14. The hole 349 for the passage of arm 358 is shown, as well as several dive and climb graduations. When the airplane is climbing or diving the angle of dive or climb is obtained by reading these graduations against the horizon on the transparent cylinder as a reference point. These graduations are particularly useful for measuring the diving angle during dive bombing runs by military airplanes. Since these dives are generally made at such steep angles that the airplane silhouette may pass out of view, the rotating graduated screen 359 of the embodiment of Figs. 13 and 14 is especially useful.

The shaft 366 and gears for raising and lowering the attitude gyro of Figs. 13 and 14 are not shown in Fig. 14 since they are similar to the elements 266, 268, etc., of Figs. 11 and 12. While the flexible hose means used to furnish the air for driving the attitude gyroscope is not shown except at 32 in the embodiment of Figs. 1 to 3, similar means are used in the other embodiments, as will be understood.

In order to permit the indications of the combined instrument to be seen through a wider angle of view, that part of the housing 411 extending in front of the cylinder 418 may be shortened as shown in the horizontal sectional view of Fig. 15, so that they do not extend to the front wall of the cylinder. The polarized window 412 is then curved concentrically with the cylinder as shown.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing decription, and all changes which come within the meaning and range of equivalency of the claims are therefore intended to be embraced therein.

The invention described herein may be manufactured and used by or for the Government of the United States of America for governmental purposes without the payment of any royalties thereon or therefor.

We claim:

1. A flight instrument comprising a transparent cylindrical compass card having a vertical axis; means supporting said card for rotation about said axis; polarized compass graduations on said card all having an axis of polarization meeting a base of said card at an angle of 45 degrees; a lubber line adjacent the graduations; a polarized viewing window located on the other side of said card and diametrically opposite to said lubber line, the axis of polarization of said window being parallel to the axis of polarization of the polarized graduations on the adjacent wall of said card and at 90 degrees to those adjacent said lubber line.

2. An exhibiting device comprising a transparent endless element; polarized indicia on said element having an axis of polarization meeting the base of said element substantially at an angle of 45 degrees; and a polarized viewing window adjacent the outer wall of said element and having an axis of polarization substantially parallel to the axis of polarization of said polarized indicia adjacent the window and at right angles to the axis of polarization of those indicia diametrically opposite to the window, whereby those indicia adjacent said window are not visible through the window and those diametrically opposite thereto are clearly visible.

3. In an aircraft flight instrument, a housing; a polarized window in the front part of said housing having its axis of polarization at about 45° to the horizontal; a transparent cylindrical element mounted adjacent to said window and within the front part of said housing so as to be rotatable about a vertical axis, the said axis being parallel to the vertical axis of the aircraft and tiltable therewith, said cylinder having a polarized scene around its periphery representing a 360° view from an airplane and including a clear horizon line and compass graduations adapted to read on a fixed lubber line, the axis of polarization of the scene, the horizon line and the compass graduations being substantially at 45° to said horizon line whereby those parts of the scene, and the horizon line and compass graduations diametrically opposite to each other have axes of polarization crossing substantially at 90 degrees, the axis of polarization of said window being parallel to that of the part of the scene, the horizon line and compass graduations adjacent said window whereby a part of the scene, the horizon line and compass graduations diametrically opposite are visible; a horizontally disposed support within said housing; a gimbal ring journalled in said support for rotation about a transverse axis; a gyroscope operable to spin about a vertical axis and journalled within said gimbal ring for movement about a longitudinal axis with respect thereto; means defining an airplane silhouette pivotally attached to said gimbal ring; said silhouette normally positioned in alignment with said horizon line; and means operated by said gyroscope for tilting said silhouette about its pivotal mounting on said gimbal ring; said means for tilting said silhouette driving said silhouette through a greater angle than the tilting movement of the axis of said cylinder so as to properly indicate the bank of the aircraft.

4. In the device described in claim 3; means for adjusting the vertical position of said support whereby said airplane silhouette may be vertically adjusted with respect to the horizon line defined by said element.

5. An aircraft flight instrument comprising a housing; a polarized window in the front part of said housing having its axis of polarization at about 45° to the horizontal; a transparent cylindrical element mounted adjacent said window and within the front part of said housing so as to be rotatable about a vertical axis, the said axis being parallel to the vertical axis of the aircraft and tiltable therewith, said cylindrical element having a polarized scene around its periphery representing a 360° view from an airplane and including a clear horizon line and compass graduations adapted to read on a fixed lubber line, the axis of polarization of the scene, the horizon line and the compass graduations being substantially at 45° to said horizon line whereby those parts of the scene, the horizon line and the compass graduations diametrically opposite each other have axes of polarization crossing substantially at 90°, the axis of polarization of said window being parallel to that part of the scene, the horizon line and the compass graduations adjacent said window, whereby a part of the scene, the horizon line and compass graduations diametrically opposite are visible; a horizontally disposed support within said housing and behind said cylindrical element; a gimbal ring journalled in said support for rotation about a transverse axis; a gyroscope operable to spin about a vertical axis and journalled within said gimbal ring for movement about a longitudinal axis; a first gear fixedly attached to said gyroscope for rotation therewith about said longitudinal axis; a second gear engaging said first gear and pivoted on said gimbal ring about an axis parallel to the axis of said first gear; airplane silhouette means affixed to said second gear in such position as to be normally in alignment with said horizon line; and an opaque cylindrical screen coaxial with the transverse axis of said gimbal ring and extending between said silhouette and the mechanism carried by said horizontally disposed support.

6. The device described in claim 5 wherein said screen comprises two cylindrical elements slightly spaced to provide a circumferential slot therebetween through which extends the support by which said silhouette is attached to said second gear.

7. The device described in claim 5 wherein said screen is affixed to and rotates with said gimbal ring; said airplane silhouette being attached to said second gear by a shaft; and an opening through said screen to provide passage for said shaft.

8. The device described in claim 5 wherein said screen is affixed to and rotates with said gimbal ring; said airplane silhouette being attached to said second gear by a shaft; an opening through said screen to provide passage for said shaft; and graduations on said screen to indicate the angle of dive or climb of the aircraft when aligned with said horizon means.

9. The device described in claim 5 wherein the axis of said second gear is coaxial with the axis of said first gear, and wherein an idler gear is journalled on said gimbal ring and interposed between said gears whereby said second gear rotates in the opposite direction from said first gear.

10. An aircraft flight instrument comprising a housing; a transparent cylindrical endless element mounted within the front part of said housing so as to be rotatable about a vertical axis therein, said element having a polarized scene around its periphery representing a 360 degree view from an airplane and including a clear horizon line and compass graduations, the axis of polarization of said scene being substantially at 45 degrees to said horizon line whereby those parts of the scene diametrically opposite to each other have axes of polarization crossing substantially at 90 degrees; a polarized window in the front part of said housing, having its axis of polarization parallel to that of the part of the scene on said element adjacent said window; means adjacent the rearward part of said endless element for illuminating that part of the element and the adjacent interior of the housing; means holding said endless element against rotation in space about the vertical axis of the housing whereby that part of said scene visible through said window appears to remain stationary in space with respect to the vertical axis of the aircraft during maneuvers; a lubber line fixed adjacent the rear portion of said element whereby the heading of the aircraft is determined; a horizontally disposed support within the rear of said housing and behind said endless element; a gimbal ring journalled in said support for rotation about a transverse axis; a gyroscope operable to spin about a vertical axis and journalled within said gimbal ring for movement about a longitudinal axis; a first gear fixedly attached to said gyroscope for rotation about said longitudinal axis; a second gear engaging said first gear and pivotally attached to said gimbal ring about an axis parallel to the axis of said first gear; airplane silhouette means affixed to said second gear and positioned outside and closely adjacent the rear part of said endless element and in alignment with said horizon line; and an opaque cylindrical screen coaxial with the transverse axis of said gimbal ring and extending between said silhouette and the mechanism carried by said horizontally disposed support, whereby said silhouette is visible through said window and its attitude with respect to the horizon line on said element indicates the relative attitude of the aircraft with respect to the true horizon.

11. An aircraft flight instrument comprising a housing; an endless element mounted within said housing so as to be rotatable about a vertical axis, said element having a scene around its periphery representing a 360 degree view from an airplane and including a relatively clear horizon; a window in said housing for viewing a section of said scene; compass graduations on said element and a fixed lubber line for cooperation with said graduations both visible through said window; and means holding said element against rotation with said housing about its vertical axis during flying maneuvers of the airplane, wherein said endless element is transparent and wherein the images comprising said scene are polarized with an axis of polarization substantially 45 degrees to the horizontal base of said element, whereby those images diametrically opposite to each other have axes of polarization crossing substantially at 90 degrees; and wherein said window is polarized with its axis of polarization paralleling the axis of polarization of the scene formed on that part of said element directly adjacent said window.

12. An aircraft flight instrument comprising a housing; an endless element mounted within said housing so as to be rotatable about a vertical axis, said element having a scene around its periphery representing a 360 degree view from an airplane and including a relatively clear horizon; a window in said housing for viewing a section of said scene; compass graduations on said element and a fixed lubber line for cooperation with said graduations both visible through said window; and means holding said element against rotation with said housing about its vertical axis during flying maneuvers of the airplane, wherein said endless element is transparent and wherein the images comprising said scene and said compass graduations are polarized with an axis of polarization substantially 45 degrees to the horizontal base of said element, whereby those images diametrically opposite to each other have axes of polarization crossing substantially at 90 degrees; and wherein said window is polarized with its axis of polarization paralleling that of the scene formed on the part of said element directly adjacent said window, there being means within said housing to illuminate that part of said element remote from said window.

13. An aircraft flight instrument comprising a housing; an endless element within said housing having a scene representing a 360 degree view from an airplane and including a relatively clear horizon; compass graduations on said element; a window in said housing through which part of said scene is visible; means holding said element against rotation with said housing about the vertical axis of the aircraft, whereby the part of said scene and compass graduations visible through said window appear to remain stationary with respect to the vertical axis of the aircraft during maneuvers; means forming a silhouette of an airplane; means supporting said silhouette within said housing so that it is visible adjacent said scene; a freely mounted gyroscope within said housing and spinning about a vertical axis; means connecting said silhouette to said gyroscope so that the position of said silhouette with respect to the horizon on said scene indicates the attitude of the airplane with respect to the true horizon;

and a lubber line adjacent the compass graduations to determine the heading of the aircraft, wherein said endless element is transparent and wherein the images comprising said scene and compass graduations are polarized with an axis of polarization substantially 45 degrees to the horizontal base of said element whereby those images diametrically opposite to each other have axes of polarization crossing substantially at 90 degrees and wherein said window is polarized with its axis of polarization paralleling that of the scene formed on the part of said element directly adjacent said window, there being means within said housing to illuminate that part of said element remote from said window.

14. An aircraft flight instrument comprising a housing; a window in said housing; means defining a horizon line with azimuthal indicia rotatable with respect to the aircraft about the vertical axis of the aircraft and visible through said window; a horizontally disposed support within said housing and behind said horizon defining means; a gimbal ring journalled in said support for rotation about a transverse axis; a gyroscope operable to spin about a vertical axis and journalled within said gimbal ring for movement about a longitudinal axis; a first gear fixedly attached to said gyroscope for rotation therewith about the said longitudinal axis; a second gear engaging said first gear and pivoted on said gimbal ring about an axis parallel to the axis of said first gear; airplane silhouette means affixed to said second gear in such position as to be normally in alignment with said horizon line; an opaque cylindrical screen coaxial with the transverse axis of said gimbal ring and extending between said silhouette and the mechanism carried by said horizontally disposed support; and means to raise or lower said horizontally disposed support wherein said screen is carried by and moves with said support.

GEORGE W. HOOVER.
ERVING E. EASTON.

REFERENCES CITED

The following references are of record in the file of this patent:

UNITED STATES PATENTS

| Number | Name | Date |
|---|---|---|
| 38,126 | Ritchie | Apr. 7, 1863 |
| 1,856,436 | Schueller | May 3, 1932 |
| 2,018,735 | Narveson et al. | Oct. 29, 1935 |
| 2,038,531 | Bassett et al. | Apr. 28, 1936 |
| 2,053,182 | Crane et al. | Sept. 1, 1936 |
| 2,053,183 | Crane et al. | Sept. 1, 1936 |
| 2,183,133 | Carter | Dec. 12, 1939 |
| 2,283,190 | Crane | May 19, 1942 |
| 2,323,897 | Carter | July 13, 1943 |
| 2,395,250 | Carlson | Feb. 19, 1946 |

FOREIGN PATENTS

| Number | Country | Date |
|---|---|---|
| 139,920 | Great Britain | Mar. 18, 1920 |
| 374,873 | Germany | May 1, 1923 |
| 651,601 | Germany | Oct. 18, 1937 |